United States Patent Office 3,763,071
Patented Oct. 2, 1973

3,763,071
DISPERSIBLE SUSPENSIONS OF FUNCTIONAL POLYMERS
Melvin F. Katzer, Danville, and Sewood Sewell, Concord, Calif., assignors to The Dow Chemical Company, Midland, Mich.
No Drawing. Filed Apr. 14, 1969, Ser. No. 816,076
Int. Cl. C08f 29/26, 33/04, 37/00
U.S. Cl. 260—29.6 E                    6 Claims

ABSTRACT OF THE DISCLOSURE

Water-dispersible, functional polymers, such as linear or partially crosslinked homopolymers and copolymers of acrylamide or acrylic acid, are slurried in a water miscible non-solvent. Water or a liquid organic swelling agent is incorporated into the slurry to partially solvate and thereby swell the water dispersible solids. This reduces their bulk density thereby decreasing the tendency of the polymer solids to settle out of suspension and at the same time improves their water-dispersibility. Such polymer suspensions are easily maintained or reformed by the application of mild agitation.

BACKGROUND OF INVENTION

When water-swellable or soluble functional polymers, such as partially crosslinked or linear copolymers of acrylamide and acrylic acid are dispersed in water, the tendency of these polymers to initially form slowly dissolving agglomerates is a problem. Sometimes the agglomerates require as much as a day or more to uniformly disperse. Such delays pose a serious handicap to their usefulness.

Among various techniques that have been developed to minimize the agglomeration problem are treatments whereby each polymer particle is coated with a material that decreases its solubility in water. This facilitates a more efficient initial dispersion of the particles. Once their surfaces are wet, their tendency to agglomerate is minimized and the individual particles rapidly undergo complete solvation. Another technique involves dispersing the polymer particles into a liquid which is a non-solvent for the polymer. The resulting suspension can then be dispersed in a solvent for the polymer without forming agglomerates.

One difficulty encountered in preparing a suspension of a polymer in a non-solvent, however, is the tendency of the polymer solids to settle and compact on standing. Occasionally, the settled solids will form relatively hard packs within a few hours after the suspension is formed. Suspension of these packs is achieved only by the application of shearing agitation, which is often not available, or is difficult to introduce into a typical shipping container.

It would be desirable, and it is a principal object of the instant invention, to provide an improved method for dispersing water swellable or soluble functional polymers in water. A more particular object is to provide an improved polymer suspension for the preparation of polymer dispersions.

SUMMARY OF INVENTION

In accordance with the invention, an improved water dispersible polymer preparation comprises water dispersible functional polymer solids and a suspending medium for the polymer in the form of a water soluble organic liquid in which the polymer is not soluble. Additionally, the preparation comprises a small amount of a polymer-swelling liquid, i.e., water or liquid organo solvent for the polymer. The amount of polymer-swelling liquid utilized is sufficient to reduce the bulk density of the polymer solids whereby suspensions are formed in the non-solvent having enhanced stability against compaction.

Although the invention is in no way predicated upon an understanding of theory, it is believed that the water or other swelling agent incorporated into the suspension of polymer solids is absorbed by the solids, thus increasing their size. This decreases their bulk density relative to the suspending medium and, accordingly, reduces their tendency to settle and compact. In the event the swollen polymer particles are allowed to settle, they do not form hard packs which characterize suspensions of non-swollen polymer solids. When dispersed in water, the partially swollen polymer particles readily undergo solvation without forming difficultly soluble agglomerates.

DETAILED DESCRIPTION OF INVENTION

Polymer preparations, in accordance with the invention, preferably contain from about 0.1 to 1 part of functional polymer solids per part by weight of suspending medium. The amount of polymer-swelling liquid utilized is not critical inasmuch as very small amounts will produce some improvement. Generally, the amount of water or solvating organic liquid, will be within the range from about 2 to about 10 percent, based on the weight of functional polymer solids in the suspending medium. Larger amounts of polymer-swelling liquids can be used, but care should be taken not to exceed that concentration level at which the polymer is sufficiently solvated to produce a gelled or non-fluid suspension. The precise concentration of swelling agent at which this occurs will vary depending upon the solubility properties of the polymer solids and the nature of the polymer-swelling liquid.

Suspensions of swollen functional polymer solids prepared in the above manner are useful in the preparation of polymer solutions for variety of applications. For instance, it is well known that the water swellable polymers are efficient thickening agent, fire fighting agents, adsorbants and humectants. Many of these applications, however, require the utilization of the polymer in the form of a dilute solution or dispersion such as can be prepared from the swollen polymer suspensions of the invention.

Exemplary of the polymers useful in the practice of the invention are water dispersible polyalkanes to which water sensitivity is imparted by the presence along the polymeric polyalkane chain, which may be either linear, branched or lightly crosslinked, of sufficient hydrophilic moieties to render the polymer water-dispersible. By "water-dispersible" is meant uniformly suspendable in water to form transparent or translucent systems, which are essentially continuous in composition. Examples of the hydrophilic moities are sulfate and sulfonate groups, carboxylate salt groups, amino and ammonium groups, the latter being inclusive of protonated as well as quaternary derivatives of the amines, e.g., mono-, di-, tri- and tetraalkyl substituted ammonium salt groups. Cations associated with the aforementioned acid moieties are preferably alkali metal, alkaline earth metal and ammonium salts. In general any water-soluble cation may be present on the polymer. Anions associated with quaternary derivatives of the amines are usually halogens, sulfate and phosphate anions. Another class of water-solubility imparting hydrophilic moieties are carboxamide, hydroxyl, acetyl, ketyl, carbamate and lactam groups.

Numerous water-dispersible polymers which have alkane backbones are described in Hedrick et al., U.S. 2,625,529, Aimone et al., U.S. 2,740,522, and Booth et al., U.S. 2,729,557. Illustrative of polymers containing carbamate and lactam groups are those of Hibbard et al., U.S. 3,044,992, Walles et al., U.S. 2,946,772, Vitales, U.S. 2,874,124, and Fong et al., U.S. 3,000,830. Further teachings regarding water soluble functional polymers are contained in Davidson and Sittig "Water Soluble Resins," Reinhold Pub. Corp., N.Y. 1962..

Particular functional polyalkanes used in the practice of the invention are the water-dispersible acrylic polymers having attached along their linear or lightly crosslinked polyalkane backbones a plurality of groups having the formula:

wherein X is a hydroxyl or amide group. The hydrogen atom on the hydroxyl may be replaced with a water-soluble cation such as an alkali metal, alkaline earth metal or ammonium moiety. Hydrogens on the amide may be replaced with alkyl hydrocarbons to provide soluble amide groups. Such acrylic polymers include poly(N-methylacrylamide), polyacrylic acid, acrylamide-acrylic acid copolymers, N-butylacrylamide-acrylic acid copolymers, styrene-acrylic acid copolymers, styrene maleic acid and ethylene-acrylic acid copolymers, sodium and potassium salts of the polymer acids, polyacrylamide, polymethacrylamide, and poly-N-dimethylaminoacrylamide.

Other functional polyalkanes obtained as polymerization products of ethylenically unsaturated monomers include polyvinyl alcohol, polyvinyl pyrrolidinone, polyvinyloxazolidinone, poly(aminoethylacrylate), polyvinylpyridine, and polyvinylbenzyltrimethyl ammonium chloride.

Although the technology of the instant invention will be most generally applied to polymers which do have a few cross-links between polyalkane chains, the invention is also useful as applied to water-soluble polymers which are essentially linear in nature.

Useful suspending media for the functional polymers, i.e., the water-soluble non-solvent for the polymer, include those organo liquid solvents meeting the criteria of water solubility to at least about 0.5 weight percent and essential inertness to the polymer. As will be manifest to those skilled in the art, the usefulness of particular organo liquids will vary according to the composition of the polymer solids. Generally useful as suspending media for acrylic type polymers are the polyoxyalkylene glycols and glycol ethers having molecular weights above about 130. Specific examples are triethylene and tripropylene glycols, dipropylene glycol, polyethylene glycol having a molecular weight from about 200 to 600 and polypropylene glycol having a molecular weight from about 250 to 1200. Lower ketone and alcohols, such as acetone, methyl ethyl ketone, methanol and ethanol are generally useful as polymer suspending media.

Polymer swelling agents in addition to water include some of the more polar organo liquids such as formamide, dimethylsulfoxide, acetic acid, ethylene glycol, propylene glycol, ethylenediamine, glycerol and dioxolane. Still other solvents include oxazolidinone, pyrrolidinone and morpholinone, the latter being particularly useful as swelling agents for the corresponding polymers.

In the preparation of the polymer slurries of the instant invention, preferred practice is to first add the polymer swelling agent to the suspending medium and then disperse the functional polymer solids in the non-solvent suspending medium to form a solids-in-liquid suspension. Although there is no lower concentration limit for operability, such suspensions will practically contain at least about 0.1 part by weight of polymer per part by weight of the suspending medium. The upper limit is determined only by that proportion of polymer solids at which the slurry loses its liquidus properties. For most suspensions this is at about 50 percent by weight solids, i.e., about 1 part by weight of the polymer per part by weight of suspending medium. Mixed with the suspending agent by any convenient agitating means is a small amount of the polymer swelling agent. This should generally be added before the polymer is added in order to have it uniformly dispersed so that the polymer will be uniformly exposed to this swelling agent. The amount used should produce significant swelling of the polymer particles. For most polymers this is achieved with the employment of as little as about 2 percent by weight of the swelling agent based on the weight of the polymer solids. Effective swelling sufficient to diminish the compaction problem will usually be achieved with the employment of the swelling agent in an amount less than about 20 percent based on the weight of the polymer solids. Larger amounts of the swelling agent can be utilized if desired. One qualification on the amount of swelling agent employed stems from the fact that, as the polymer becomes swollen in suspension, it occupies a larger volume. Accordingly the amount of polymer that may be suspended and yet produce a liquid suspension of the solids decreases as the amount of swelling agent is increased. Optimumly the amount of swelling agent employed will be within the range from about 2 to about 10 percent by weight based on the suspended polymer solids.

Polymer suspensions prepared in accordance with the invention are readily utilized in a conventional manner for handling liquids. That is, the suspension may be diluted in water or applied directly to fluid systems in which dispersion of the polymer is desired. The suspension is readily dispersed without the formation of troublesome agglomerates.

The invention is illustrated by the following examples in which all percentage specifications are based on the total weight of the composition unless otherwise specified.

Examples 1-10

A slurry of a finely particulate, water-swellable, lightly crosslinked acrylamide-acrylic acid copolymer in the sodium salt form was prepared in a polyethylene glycol of about 200 molecular weight (Glycol 200). The glycol was completely miscible in water. One aliquot of the slurry was separated for subsequent testing and to each of four other aliquots was added water in increasing amounts. All of the slurries thus prepared were placed on a vibrator for 24 hours. At the end of the 24 hours, the quality of the suspension, in reference to the completeness and uniformity of dispersion, was observed visually. On this basis, the suspensions were ordered in terms of quality. In the following table, the higher the rating number, the better the quality.

The slurries were then stored for about 6 weeks after which they were again observed for the ease with which the suspension was reformed and uniformity of dispersion in water. Particular formulations and observations are set forth in the following table.

TABLE

| Example number | Slurry recipe | Rating after 24 hrs. of vibration | Slurry condition after 6 weeks of aging |
|---|---|---|---|
| 1 | 45% polymer, 55% Glycol 200 | 1 | Packed. |
| 2 | 45% polymer 54.5% Glycol 200, 0.5% H$_2$O | 2 | Readily slurries and disperses. |
| 3 | 45% polymer, 54% Glycol 200, 1% H$_2$O | 4 | Do. |
| 4 | 44.5% polymer, 53.5% Glycol 200, 2% H$_2$O | 3 | Do. |
| 5 | 44.5% polymer, 52.5% Glycol 200, 3% H$_2$O | 2 | Slight gel—readily slurries and disperses. |
| 6 | 45% polymer, 52.5% dipropylene glycol, 2.5% H$_2$O | 2 | Packed but a dispersible slurry is readily formed. |
| 7 | 45% polymer, 54% Glycol 200, 1% glycerol | 2 | Readily slurries and disperses. |
| 8 | 45% polymer, 53% Glycol 200, 2% glycerol | 2 | Do. |
| 9 | 44.5% polymer, 54.5% Glycol 200, 1% ethylene glycol | 1 | Some packing but a dispersible slurry is readily formed. |
| 10 | 44.5% polymer, 54.5% Glycol 200, 1% formamide | 1 | Packed but a dispersible slurry is readily formed. |

Example 11

Slurries of a water-soluble copolymer of sodium acrylate and acrylamide were prepared by adding 10 grams of the polymer to 10 cc. of polyethylene glycol of about 200 molecular weight. Water was added to swell the polymer. 0.2 cc. and 0.4 cc. of water had little effect. 0.8 cc. of water caused the slurry to become too stiff. A water content of about 0.6 cc. (=3.0% by weight) is optimum for this formulation.

In a manner similar to the above examples, the amount of polymer swelling agent to be incorporated in the polymer-non-solvent-suspension to achieve improved suspension stability is readily determined. Comparable results are achieved by using an organic liquid swelling agent, such as ethylene glycol for acrylic polymers. Generally, effective swelling is achieved with the use of about 2 to about 10 percent by weight of a swelling agent, based on the weight of the slurry.

From the above data, it is apparent that dispersibility of this slurry improves up to a point of about 2 to 3 percent by weight water. After this level, the combined solvency of water and the non-solvent is sufficient that the polymer system begins to gel or become rubbery.

What is claimed is:

1. A water dispersible polymer formulation comprising water-dispersible polymer solids selected from the group consisting of polyvinyl alcohol, polyvinylpyrrolidinone, polyvinyloxazolidinone, poly(aminoethyl acrylate), polyvinylpyridine, polyvinylbenzyltrimethylammonium chloride, and acrylic polymers having attached along the polyalkane backbone a plurality of groups of the formula:

wherein X is (1) a hydroxyl or soluble metal derivative thereof or (2) an amide group or a soluble alkyl derivative thereof, suspended in a liquid, organic suspending medium consisting of a water-soluble polyalkylene glycol or ether thereof having a molecular weight of above about 130 and said formulation further containing a swelling agent for the polymer solids selected from the group consisting of water, glycerol, ethylene glycol and formamide, said agent being employed in an amount within the range of from about 2% up to about 10% of the weight of the polymer solids wherein said amount is adjusted to provide sufficient swelling agent to enhance the stability of the formulation against compaction without causing the polymer system to gel.

2. A composition as in claim 1 wherein the polymer solids consist of a partially crosslinked acrylic polymer having attached along its polyalkane backbone a plurality of groups of the formula

where X is (1) a hydroxyl or soluble metal derivative thereof, or (2) amide group or a soluble alkyl derivative thereof.

3. A composition as in claim 2 wherein the polymer is a copolymer of acrylamide and acrylic acid or an alkali metal salt thereof.

4. A composition as in claim 2 wherein the swelling agent is water.

5. A method for dispersing water-dispersible functional polymer solids in water, said functional polymer being selected from the group consisting of polyvinyl alcohol, polyvinylpyrrolidinone, polyvinyloxazolidinone, poly(aminoethyl acrylate), polyvinylpyridine, polyvinylbenzyltrimethylammonium chloride, and acrylic polymers having attached along the polyalkane backbone a plurality of groups of the formula:

wherein X is (1) a hydroxyl or soluble metal derivative thereof, or (2) an amide group or a soluble alkyl derivative thereof, which method comprises (1) forming a slurry of the polymer solids in a suspending medium consisting of a liquid polyalkylene glycol or ether thereof having a molecular weight of above about 130 which is soluble in water, (2) incorporating into the slurry from about 2 to about 10 percent by weight of a polymer swelling agent to partially swell the polymer solids thereby reducing their bulk density relative to the density of the suspending medium, and (3) dispersing the above prepared slurry in water.

6. A method as in claim 5 wherein the polymer is an acrylic polymer, and the swelling agent is water.

References Cited
UNITED STATES PATENTS

| | | | |
|---|---|---|---|
| 3,054,764 | 9/1962 | Walles et al. | 260—29.6 |
| 3,282,874 | 11/1966 | Friedrich et al. | 260—29.2 |
| 3,350,338 | 10/1967 | Savage | 260—29.6 |
| 3,412,060 | 11/1968 | Sarem | 260—29.6 |

MELVIN GOLDSTEIN, Primary Examiner

U.S. Cl. X.R.

260—29.6 BE, HN, 32.6 N, R, 33.2 R, 33.4 R